(12) United States Patent
Etter

(10) Patent No.: US 8,654,483 B2
(45) Date of Patent: Feb. 18, 2014

(54) POWER SYSTEM HAVING VOLTAGE-BASED MONITORING FOR OVER CURRENT PROTECTION

(75) Inventor: Brett E. Etter, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 1056 days.

(21) Appl. No.: 12/614,607

(22) Filed: Nov. 9, 2009

(65) Prior Publication Data
US 2011/0110000 A1    May 12, 2011

(51) Int. Cl.
*H02H 7/00* (2006.01)
(52) U.S. Cl.
USPC ............................................. 361/18
(58) Field of Classification Search
USPC ............................................. 361/18
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm |
| 4,677,366 A | 6/1987 | Wilkinson et al. |
| 4,683,529 A | 7/1987 | Bucher |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |

(Continued)

FOREIGN PATENT DOCUMENTS

| | | |
|---|---|---|
| DE | 19713814 | 10/1998 |
| EP | 0585789 A1 | 3/1994 |

(Continued)

OTHER PUBLICATIONS

Infineon, CCM-PFC Standalone Power Factor Correction (PFC) Controller in Continuous Conduction Mode (CCM), Version 2.1, Feb. 6, 2007.

(Continued)

*Primary Examiner* — Ronald W Leja
(74) *Attorney, Agent, or Firm* — Terrile, Cannatti, Chambers & Holland, LLP; Kent B. Chambers

(57) ABSTRACT

A power control system reduces power losses by utilizing an over current protection method that detects an over current event based on a power utilization factor $P_{UTIL}$ and an output voltage of an output stage of the power control system. In at least one embodiment, the power control system detects the over current event without sensing an output current in an output stage of the power control system. Since the output current is not sensed, the power control system avoids power losses otherwise associated with sensing the output current. The power control system includes a power factor correction (PFC) stage and an isolation stage. A controller determines the power utilization factor $P_{UTIL}$ using voltages sensed from the PFC stage. In at least one embodiment, the controller responds to the over current event by entering an over current protection mode.

25 Claims, 5 Drawing Sheets

(56) References Cited

U.S. PATENT DOCUMENTS

| | | |
|---|---|---|
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,055,746 A | 10/1991 | Hu et al. |
| 5,109,185 A | 4/1992 | Ball |
| 5,121,079 A | 6/1992 | Dargatz |
| 5,206,540 A | 4/1993 | de Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,430,635 A * | 7/1995 | Liu .................................. 363/37 |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,768,111 A | 6/1998 | Zaitsu |
| 5,781,040 A | 7/1998 | Myers |
| 5,783,909 A | 7/1998 | Hochstein |
| 5,798,635 A | 8/1998 | Hwang et al. |
| 5,900,683 A | 5/1999 | Rinehart et al. |
| 5,912,812 A | 6/1999 | Moriarty, Jr. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh et al. |
| 5,960,207 A | 9/1999 | Brown |
| 5,962,989 A | 10/1999 | Baker |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,091,233 A | 7/2000 | Hwang |
| 6,125,046 A | 9/2000 | Jang et al. |
| 6,150,774 A | 11/2000 | Mueller et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,369,525 B1 | 4/2002 | Chang et al. |
| 6,385,063 B1 | 5/2002 | Sadek et al. |
| 6,407,514 B1 | 6/2002 | Glaser et al. |
| 6,407,515 B1 | 6/2002 | Hesler |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,657,417 B1 | 12/2003 | Hwang |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Melanson et al. |
| 6,753,661 B2 | 6/2004 | Muthu et al. |
| 6,756,772 B2 | 6/2004 | McGinnis |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,958,920 B2 | 10/2005 | Mednik et al. |
| 6,963,496 B2 | 11/2005 | Bimbaud |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 | 12/2005 | Simada et al. |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,072,191 B2 | 7/2006 | Nakao et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,099,163 B1 | 8/2006 | Ying |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shteynberg et al. |
| 7,180,250 B1 | 2/2007 | Gannon |
| 7,183,957 B1 | 2/2007 | Melanson |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,276,861 B1 | 10/2007 | Shteynberg et al. |
| 7,288,902 B1 | 10/2007 | Melanson |
| 7,292,013 B1 | 11/2007 | Chen et al. |
| 7,310,244 B2 | 12/2007 | Yang et al. |
| 7,345,458 B2 | 3/2008 | Kanai et al. |
| 7,375,476 B2 | 5/2008 | Walter et al. |
| 7,388,764 B2 | 6/2008 | Huynh et al. |
| 7,394,210 B2 | 7/2008 | Ashdown |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,583,136 B2 | 9/2009 | Pelly |
| 7,656,103 B2 | 2/2010 | Shteynberg et al. |
| 7,667,986 B2 | 2/2010 | Artusi et al. |
| 7,710,047 B2 | 5/2010 | Shteynberg et al. |
| 7,719,246 B2 | 5/2010 | Melanson |

(56) References Cited

U.S. PATENT DOCUMENTS

| | | |
|---|---|---|
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasake et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0218838 A1 | 10/2005 | Lys |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022648 A1* | 2/2006 | Ben-Yaakov et al. ......... 323/222 |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0147544 A1 | 6/2009 | Melanson |
| 2009/0174479 A1 | 7/2009 | Yan et al. |
| 2009/0218960 A1 | 9/2009 | Lyons et al. |
| 2010/0141317 A1 | 6/2010 | Szajnowski |

FOREIGN PATENT DOCUMENTS

| | | |
|---|---|---|
| EP | 0632679 | 1/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1528785 A | 5/2005 |
| EP | 2204905 A1 | 7/2010 |
| GB | 2069269 A | 8/1981 |
| WO | WO9725836 | 7/1997 |
| WO | 01/15316 A1 | 1/2001 |
| WO | 01/97384 A | 12/2001 |
| WO | 02/15386 A2 | 2/2002 |
| WO | WO0227944 | 4/2002 |
| WO | 02/091805 A2 | 11/2002 |
| WO | WO 2006/022107 A2 | 3/2006 |
| WO | 2006/067521 A | 6/2006 |
| WO | WO2006013557 | 6/2006 |
| WO | WO2006135584 | 12/2006 |
| WO | 2007/026170 A | 3/2007 |
| WO | 2007/079362 A | 7/2007 |
| WO | WO2008072160 | 6/2008 |
| WO | WO2008152838 | 12/2008 |

OTHER PUBLICATIONS

International Rectifier, IRAC1150-300W Demo Board, User's Guide, Rev 3.0, Aug. 2, 2005.

International Rectifier, Application Note AN-1077,PFC Converter Design with IR1150 One Cycle Control IC, rev. 2.3, Jun. 2005.

International Rectifier, Data Sheet PD60230 revC, Feb. 5, 2007.

Lu et al., International Rectifier, Bridgeless PFC Implementation Using One Cycle Control Technique, 2005.

Linear Technology, LT1248, Power Factor Controller, Apr. 20, 2007.

On Semiconductor, AND8123/D, Power Factor Correction Stages Operating in Critical Conduction Mode, Sep. 2003.

On Semiconductor, MC33260, GreenLine Compact Power Factor Controller: Innovative Circuit for Cost Effective Solutions, Sep. 2005.

On Semiconductor, NCP1605, Enhanced, High Voltage and Efficient Standby Mode, Power Factor Controller, Feb. 2007.

On Semconductor, NCP1606, Cost Effective Power Factor Controller, Mar. 2007.

On Semiconductor, NCP1654, Product Review, Power Factor Controller for Compact and Robust, Continuous Conduction Mode Pre-Converters, Mar. 2007.

Philips, Application Note, 90W Resonant SMPS with TEA1610 SwingChip, AN99011, 1999.

NXP, TEA1750, GreenChip III SMPS control IC Product Data Sheet, Apr. 6, 2007.

Renesas, HA16174P/FP, Power Factor Correction Controller IC, Jan. 6, 2006.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

STMicroelectronics, L6563, Advanced Transition-Mode PFC Controller, Mar. 2007.

Texas Instruments, Application Note SLUA321, Startup Current Transient of the Leading Edge Triggered PFC Controllers, Jul. 2004.

Texas Instruments, Application Report, SLUA309A, Avoiding Audible Noise at Light Loads when using Leading Edge Triggered PFC Converters, Sep. 2004.

(56) References Cited

OTHER PUBLICATIONS

Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.
J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEE Transactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.
J.W.F. Dorleijn et al., Standardisation of the Static Resistances of Fluorescent Lamp Cathodes and New Data for Preheating, Industry Applications Conference, vol. 1, Oct. 13-Oct. 18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.
G. Yao et al., Soft Switching Circuit for Interleaved Boost Converters, IEEE Transactions on Power Electronics, vol. 22, No. 1, Jan. 2007.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction and FPGA Implementation, IEEE Transactions on Power Electronics, vol. 21, No. 6, Nov. 2006.
H. Wu et al., Single Phase Three-Level Power Factor Correction Circuit with Passive Lossless Snubber, IEEE Transactions on Power Electronics, vol. 17, No. 2, Mar. 2006.
O. Garcia et al., High Efficiency PFC Converter to Meet EN61000-3-2 and A14, Proceedings of the 2002 IEEE International Symposium on Industrial Electronics, vol. 3, 2002.

P. Lee et al., Steady-State Analysis of an Interleaved Boost Converter with Coupled Inductors, IEEE Transactions on Industrial Electronics, vol. 47, No. 4, Aug. 2000.
D.K.W. Cheng et al., A New Improved Boost Converter with Ripple Free Input Current Using Coupled Inductors, Power Electronics and Variable Speed Drives, Sep. 21-23, 1998.
B.A. Miwa et al., High Efficiency Power Factor Correction Using Interleaved Techniques, Applied Power Electronics Conference and Exposition, Seventh Annual Conference Proceedings, Feb. 23-27, 1992.
Z. Lai et al., A Family of Power-Factor-Correction Controllers, Twelfth Annual Applied Power Electronics Conference and Exposition, vol. 1, Feb. 23-Feb. 27, 1997.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7-Mar. 11, 1993.
Fairchild Semiconductor, Application Note 42030, Theory and Application of the ML4821 Average Current Mode PFC Controller, Oct. 25, 2000.
Unitrode Products From Texas Instruments, BiCMOS Power Factor Preregulator, Feb. 2006.
Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20, 2011.
Freescale Semiconductor, Inc., Dimmable Light Ballast with Power Factor Correction, Design Reference Manual, DRM067, Rev. 1, Dec. 2005.
J. Zhou et al., Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.
D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
Y. Ohno, Spectral Design Considerations for White LED Color Rendering, Final Manuscript, Optical Engineering, vol. 44, 111302 (2005).
S. Skogstad et al., A Proposed Stability Characterization and Verification Method for High-Order Single-Bit Delta-Sigma Modulators, Norchip Conference, Nov. 2006 http://folk.uio.no/sayskogs/pub/A_Proposed_Stability_Characterization.pdf.
J. Turchi, Four Key Steps to Design a Continuous Conduction Mode PFC Stage Using the NCP1653, ON Semiconductor, Publication Order No. AND184/D, Nov. 2004.
Megaman, D or S Dimming ESL, Product News, Mar. 15, 2007.

(56) References Cited

OTHER PUBLICATIONS

J. Qian et al., New Charge Pump Power-Factor-Correction Electronic Ballast with a Wide Range of Line Input Voltage, IEEE Transactions on Power Electronics, vol. 14, No. 1, Jan. 1999.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
J. Qian et al., Charge Pump Power-Factor-Correction Technologies Part II: Ballast Applications, IEEE Transactions on Power Electronics, vol. 15, No. 1, Jan. 2000.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.
S. Chan et al., Design and Implementation of Dimmable Electronic Ballast Based on Integrated Inductor, IEEE Transactions on Power Electronics, vol. 22, No. 1, Jan. 2007.
M. Madigan et al., Integrated High-Quality Rectifier-Regulators, IEEE Transactions on Industrial Electronics, vol. 46, No. 4, Aug. 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
Azoteq, IQS17 Family, IQ Switch®—ProxSense™ Series, Touch Sensor, Load Control and User Interface, IQS17 Datasheet V2.00.doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Compliant 500W Dimmer with Low-Losses Symmetrical Switches, 2005 European Conference on Power Electronics and Applications, Sep. 2005.
Why Different Dimming Ranges? The Difference Between Measured and Perceived Light, 2000 http://www.lutron.com/ballast/pdf/LutronBallastpg3.pdf.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
Supertex Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
Supertex Inc., HV9931 Unity Power Factor LED Lamp Driver, Application Note AN-H52, Mar. 7, 2007.
Supertex Inc., 56W Off-line LED Driver, 120VAC with PFC, 160V, 350mA Load, Dimmer Switch Compatible, DN-H05, Feb. 2007.
ST Microelectronics, Power Factor Corrector L6561, Jun. 2004.
Fairchild Semiconductor, Application Note 42047 Power Factor Correction (PFC) Basics, Rev. 0.9.0 Aug. 19, 2004.

M. Radecker et al., Application of Single-Transistor Smart-Power IC for Fluorescent Lamp Ballast, Thirty-Fourth Annual Industry Applications Conference IEEE, vol. 1, Oct. 3-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.
Freescale Semiconductor, AN1965, Design of Indirect Power Factor Correction Using 56F800/E, Jul. 2005.
International Search Report for PCT/US2008/051072, mailed Jun. 4, 2008.
Power Integrations, Inc., "TOP200-4/14 TOPSwitch Family Three-terminal Off-line PWM Switch", XP-002524650, Jul. 1996, Sunnyvale, California.
Texas Instruments, SLOS318F, "High-Speed, Low Noise, Fully-Differential I/O Amplifiers," THS4130 and THS4131, US, Jan. 2006.
International Search Report and Written Opinion, PCT US20080062387, dated Feb. 5, 2008.
International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.
Prodic, Aleksandar, "Digital Controller for High-Frequency Rectifiers with Power Factor Correction Suitable for On-Chip Implementation," IEEE, US, 2007.
International Search Report and Written Opinion, PCT US20080062378, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
International Search Report and Written Report PCT US20080062428 dated Feb. 5, 2008.
Prodic, A. et al, "Dead Zone Digital Controller for Improved Dynamic Response of Power Factor Preregulators," IEEE, 2003.
Texas Instruments, Interleaving Continuous Conduction Mode PFC Controller, UCC28070, SLUS794C, Nov. 2007, revised Jun. 2009, Texas Instruments, Dallas TX.
Linear Technology, "Single Switch PWM Controller with Auxiliary Boost Converter," LT1950 Datasheet, Linear Technology, Inc. Milpitas, CA, 2003.
Yu, Zhenyu, 3.3V DSP for Digital Motor Control, Texas Instruments, Application Report SPRA550 dated Jun. 1999.
International Rectifier, Data Sheet No. PD60143-O Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II,

(56) References Cited

OTHER PUBLICATIONS

TI literature No. SLUP133, XP002552367, Retrieved from the Internet: URL:htt//://focus.ti.com/lit/ml/slup169/slup169.pdf the whole document.
"HV9931 Unity Power Factor LED Lamp Driver, Initial Release", Supertex Inc., Sunnyvale, CA USA 2005.
"AN-H52 Application Note: HV9931 Unity Power Factor Led Lamp Driver" Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conference, 2007. PESC 2007. IEEE, IEEE, P1, Jun. 1, 2007, pp. 1398-1404.
Spiazzi G et al: "Analysis of a High-Power Factor Electronic Ballast for High Brightness Light Emitting Diodes" Power Electronics Specialists, 2005 IEEE 36TH Conference on Jun. 12, 2005, Piscatawa, NJ, USA, IEEE, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 2, 2008.
Partial International Search Report PCT/US2008/062387 dated Feb. 5, 2008.
Noon, Jim "UC3855A/B High Performance Power Factor Preregulator", Texas Instruments, SLUA146A, May 1996, Revised Apr. 2004.
International Search Report PCT/GB2006/003259 dated Jan. 12, 2007.
Written Opinion of the International Searching Authority PCT/US2008/056739 dated Dec. 3, 2008.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
International Search Report for PCT/US2010/054036, dated Mar. 1, 2011.
D. Hausman, Lutron, RTISS-TE Operation, Real-Time Illumination Stability Systems for Trailing-Edge (Reverse Phase Control) Dimmers, v. 1.0 Dec. 2004.
International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DN-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Linear Technology, 100 Watt LED Driver, Linear Technology, 2006.
Fairchild Semiconductor, FAN7544, Simple Ballast Controller, Rev. 1.0.0, 2004.
Fairchild Semiconductor, FAN7532, Ballast Controller, Rev. 1.0.2, Jun. 2006.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu,, Apr. 5, 2010, Colorado Power Electronics Center, ECE Department, University of Colorado, Boulder, CO.
International Preliminary Report on Patentability and Written Opinion of the International Searching Authority dated May 15, 2012, issued in corresponding PCT Patent Application No. PCT/US2010/054036.
PCT US2010/54036 International Search Report dated Feb. 22, 2011.

* cited by examiner

POWER SYSTEM HAVING VOLTAGE-BASED MONITORING FOR OVER CURRENT PROTECTION

BACKGROUND OF THE INVENTION

1. Field of the Invention

The present invention relates in general to the field of electronics, and more specifically to a power control system and method with voltage-based monitoring for over current protection.

2. Description of the Related Art

Power control systems often utilize one or more power conversion stages to convert alternating current (AC) voltages to direct current (DC) voltages or perform DC-to-DC conversions. For example, power control systems often contain a power factor correction (PFC) stage to provide power factor correction and regulate a link voltage, an output stage to provide output power to a load, and an isolation stage to isolate the PFC stage from the output stage.

The PFC stage and the output stage of a power control system have a one hundred percent (100%) rated power and a maximum power. The rated power refers to power available from the power control system under nominal operation conditions. The maximum power refers to a percentage of the rated power that can be supplied by the power control system for at least a limited period of time while maintaining a regulated output voltage and without damaging the power control systems and/or the load. Once the load begins demanding more power than the maximum power of the power control system, an output current of the output stage will increase, and an output voltage of the output stage will decrease. A controller that controls the power control system monitors the output current. When the output current exceeds a predetermined threshold, the controller will enter an over-current protection mode. However, circuitry used to sense the current can cause overall power losses and, thus, lower the efficiency of the power control system.

FIG. 1 depicts a power control system 100, and power control system 100 includes a PFC stage 102, an output stage 104, and an isolation stage 106 to isolate the PFC stage 102 from the output stage 104. Voltage source 108 supplies an alternating current (AC) input voltage $V_{IN}$ to a full bridge diode rectifier 110. Capacitor 112 provides high frequency filtering. The voltage source 108 is, for example, a public utility, and the AC voltage $V_{IN}$ is, for example, a 60 Hz/110 V line voltage in the United States of America or a 50 Hz/220 V line voltage in Europe. The rectifier 110 rectifies the input voltage $V_{IN}$ and supplies a rectified, time-varying, line input voltage $V_X$ to the PFC stage 102.

The power control system 100 includes a controller 114 to regulate a link voltage $V_{LINK}$ of PFC stage 102 and control isolation stage 106. Controller 114 generates a pulse-width modulated control signal $CS_0$ to control power factor correction and regulate the link voltage $V_{LINK}$ of PFC stage 102. In one embodiment, PFC stage 102 is a boost-type, switching power converter, and control signal $CS_0$ is a switch control signal that controls conversion of input voltage $V_X$ to link voltage $V_{LINK}$. Controller 114 monitors voltages $V_X$ and $V_{LINK}$ to generate switch control signal $CS_0$.

Isolation stage 106 isolates the PFC stage 102 from the output stage 104. Depending upon the type of PFC stage 102, the link voltage $V_{LINK}$ is either a multiple or a fraction of the input voltage $V_X$. In either situation, the load 116 may not be compatible with the value of the link voltage $V_{LINK}$ or compatible with a DC voltage in general. Isolation stage 106 includes a transformer 118 to convert the link voltage $V_{LINK}$ into the output voltage $V_{OUT}$. Transformer 118 is a flyback type transformer that includes switch 124. Control signal $CS_F$ controls the conductivity of switch 124 to convert link voltage $V_{LINK}$ into a time-varying, primary-side voltage $V_P$ to allow the primary-side windings 120 of transformer 118 to alternately store energy and then transfer energy to the secondary-side windings 122. In one embodiment, switch 124 is a field effect transistor (FET). Transformer 118 converts the primary side voltage $V_P$ into a secondary voltage $V_S$. A variety of other topologies are well-known for isolation stage 106, such as half-bridge and full-bridge topologies as discussed in chapter 6 of *Fundamentals of Power Electronics—Second Edition* by Erickson and Maksimović, publisher Springer Science+Business Media, LLC, copyright 2001 ("*Fundamentals of Power Electronics*").

The output stage 104 converts the secondary voltage $V_S$ into the output voltage $V_{OUT}$. The topology of output stage 104 is a matter of design choice. Exemplary topologies are a half-bridge buck converter and a full-bridge buck converter. Examples of output stage 104 are also discussed in chapter 6 of *Fundamentals of Power Electronics*.

Power control system 100 supplies load 116 with output voltage $V_{OUT}$ and output current $i_{OUT}$. The load 116 is any device that can utilize the power provided by output stage 104. Controller 114 regulates the link voltage $V_{LINK}$ and the primary-side voltage $V_P$ to establish a particular value for the secondary-side load current $i_{OUT}$. Controller 114 regulates the primary-side voltage $V_P$ by controlling the duty cycles of control signal $CS_F$. Controller 114 obtains a value of the output current $i_{OUT}$ by sensing a feedback voltage $V_{R\_SENSE}$ across sense resistor 126. The output current $i_{OUT}$ equals $V_{R\_SENSE}/R$, and R is the known resistance of sense resistor 126. Controller 114 regulates link voltage $V_{LINK}$ and the primary-side $V_P$ based on the value of output current $i_{OUT}$. If the value of the output current $i_{OUT}$ is too large, controller 114 decreases the duty cycle of control signal $CS_F$ to reduce the value of output current $i_{OUT}$. If the value of secondary side current $i_{OUT}$ is too small, controller 114 increases the duty cycle of control signal $CS_F$ to increase the value output current $i_{OUT}$.

PFC stage 102 has a rated power of $P_{RATED}$ and a maximum power of $P_{MAX}$. If load 116 demands more power than the maximum power $P_{MAX}$, the output current $i_{OUT}$ increases and the output voltage $V_{OUT}$ decreases. If the output current $i_{OUT}$ exceeds a predetermined threshold value, the power control system 100 enters an over current protection mode. The particular over current protection mode involves, for example, turning the power control system 100 OFF to protect components of the power control system 100 from damage.

Power efficiency is generally a concern when designing and utilizing power control system 100. However, the voltage drop corresponding to the feedback voltage $V_{R\_SENSE}$ across sense resistor 126 represents a power loss. Such power loss is disadvantageous.

SUMMARY OF THE INVENTION

In one embodiment of the present invention, an apparatus includes a controller to control a power supply and provide over current protection. The controller is configured to provide over current protection for the power supply using power utilization information and an output voltage of an output stage of the power supply. The power utilization information represents power utilization of the power supply.

In another embodiment of the present invention, a method includes controlling a power supply. Controlling the power supply includes using power utilization information and an output voltage of an output stage of the power supply to provide over current protection for the power supply. The power utilization information represents power utilization of the power supply.

In a further embodiment of the invention, an apparatus includes a controller to control a switching power supply and provide over current protection. The controller is configured to monitor a link voltage of the switching power converter and to determine a power utilization factor. The controller is further configured to monitor an output voltage of the switching power converter and to determine if the power utilization factor is greater than a power utilization factor threshold value. The controller is further configured to determine if an output voltage of the switching power converter is greater than an output voltage threshold value. If the power utilization factor is greater than a power utilization factor threshold value and the output voltage is less than the output voltage threshold value, then enter an over current protection mode. The power utilization factor represents power utilization of the power supply.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A power control system reduces power losses while monitoring for an over current event by utilizing an over current protection method that detects the over current event based on an output voltage of an output stage of the power control system and power utilization information. The power utilization information represents power utilization of a power supply of the power control system. In at least one embodiment, the power utilization of the power supply is represented as a normalized, power utilization factor. In at least one embodiment, the power control system detects the over current event by sensing only voltages and, in at least one embodiment, without sensing an output current in an output stage of the power control system. Since the output current is not sensed, the power control system avoids power losses otherwise associated with sensing the output current.

In at least one embodiment, addition to the output stage, the power control system includes the power factor correction (PFC) stage to provide power factor correction and, in at least one embodiment, to regulate an output voltage of the PFC stage. The power control system also includes an isolation stage to isolate the PFC stage from the output stage while allowing the PFC stage to transfer energy to the output stage. In at least one embodiment, the power control system also includes a controller to control the PFC stage and the isolation stage. The controller includes an over current protection module ("OCP module"). In at least one embodiment, the OCP module determines the power utilization factor $P_{UTIL}$ using voltages sensed from the PFC stage and/or the isolation stage. In at least one embodiment, the OCP module responds to the over current event by entering an over current protection mode.

Figure 1:
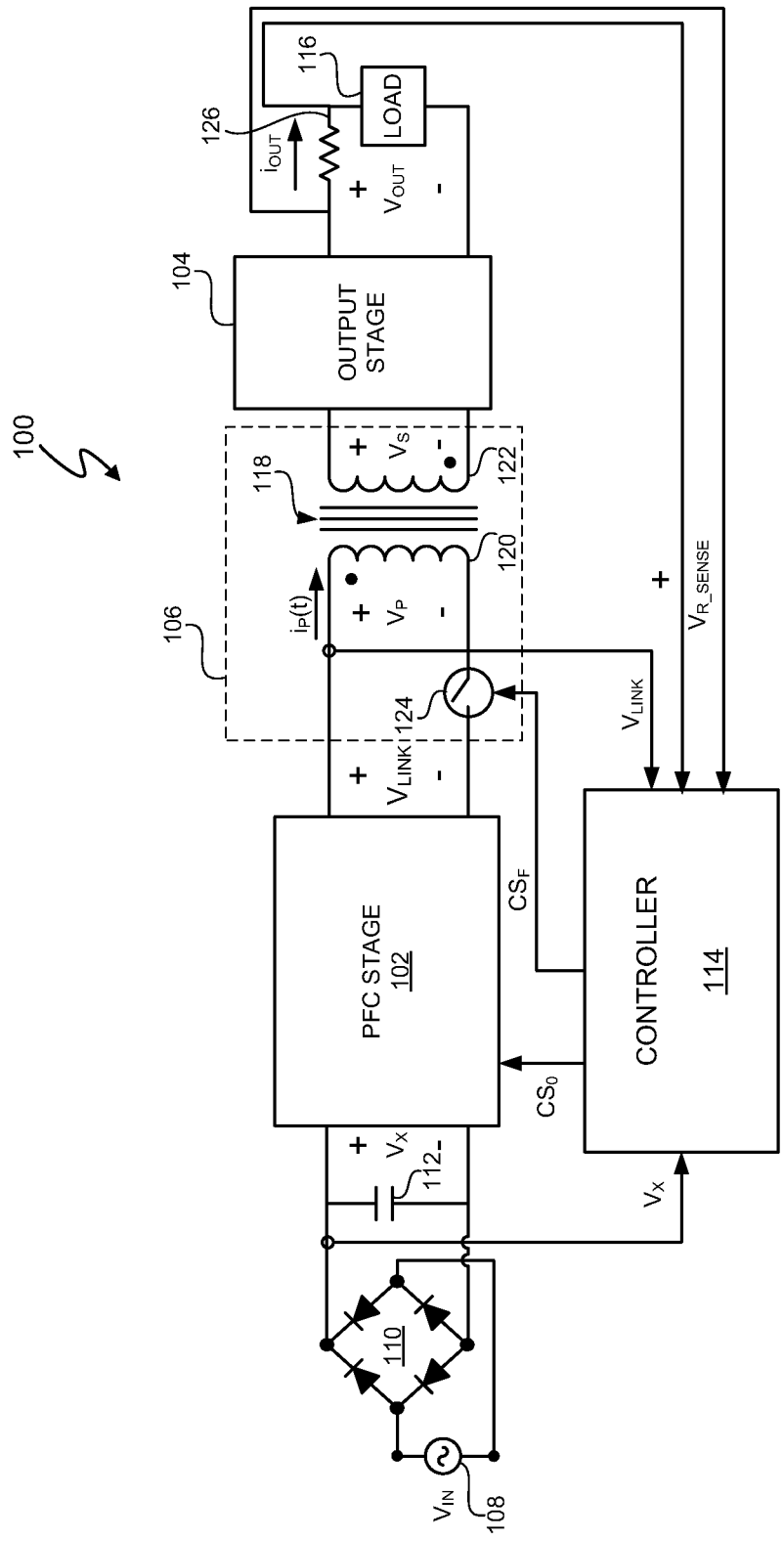
FIG. 1 (labeled prior art) depicts a power control system that monitors for an over current event by sensing an output stage current across a sense resistor.
Figure 2:
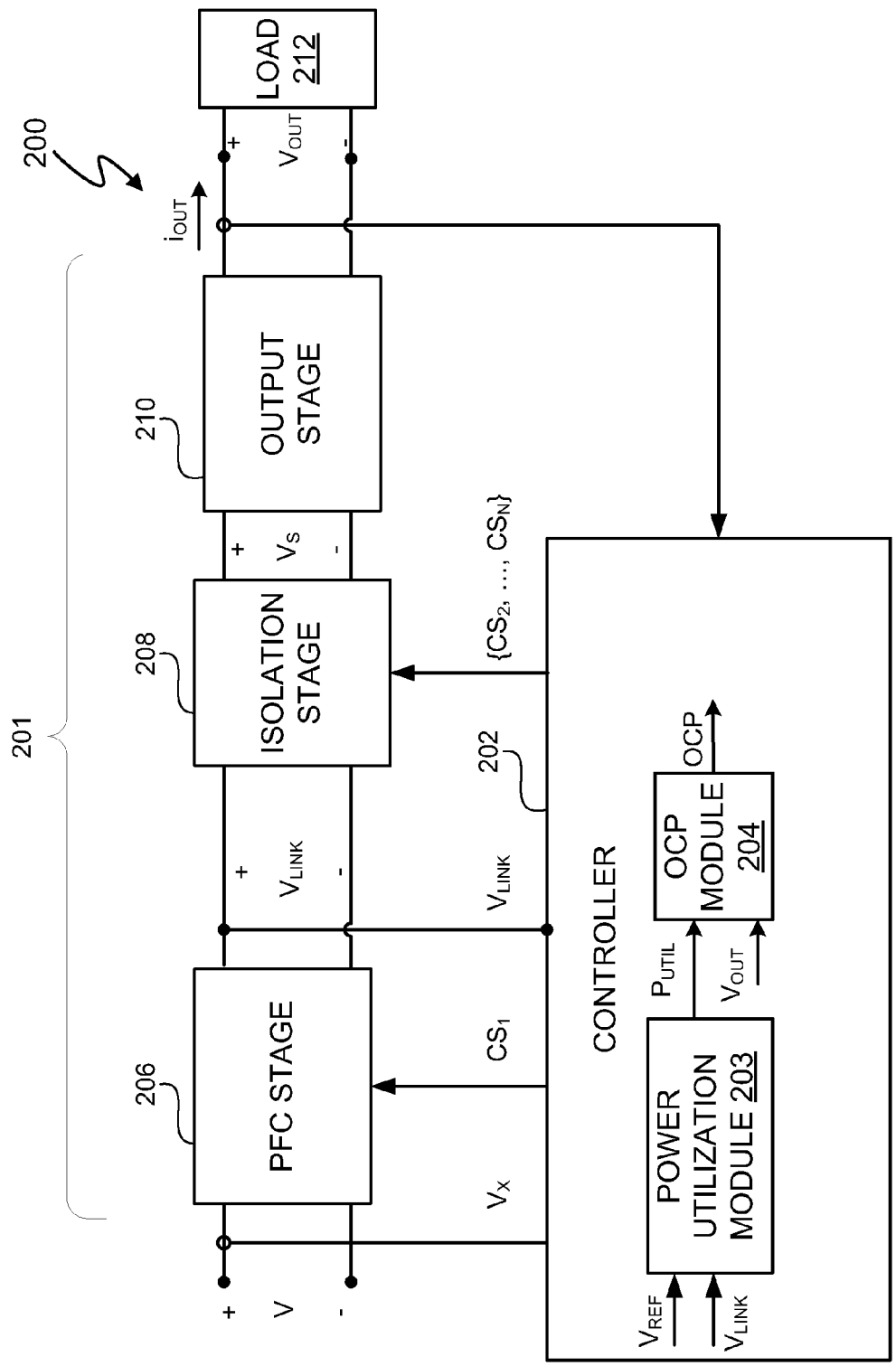
FIG. 2 depicts a power control system that monitors for an over current event using a power utilization factor and an output stage voltage.

FIG. 2 depicts a power control system 200 that includes a power supply and a controller 202. The controller 202 provides over current protection and controls conversion of an input voltage $V_X$ into an output voltage $V_{OUT}$. In at least one embodiment, controller 202 includes a power utilization module 203 that determines power utilization information in the form of a power utilization factor $P_{UTIL}$. In at least one embodiment, the power utilization factor $P_{UTIL}$ is a normalized value ranging from 0-1. The power utilization factor $P_{UTIL}$ represents the power demanded of power control system 200 by load 212. In at least one embodiment, the power utilization factor $P_{UTIL}$ is expressed as a normalized percentage of the rated power $P_{RATED}$ (as defined below) of power control system 200. For example, when the power utilization factor $P_{UTIL}$ is 0, the power demand of load 212 is zero. When the power utilization factor $P_{UTIL}$ is 1, the power demand of load 212 is 100% of rated power $P_{RATED}$.

In at least one embodiment, the OCP module 204 determines the power utilization factor $P_{UTIL}$ using the link voltage $V_{LINK}$ and a reference voltage $V_{REF}$. The OCP module 204 utilizes the output voltage $V_{OUT}$ of output stage 210 of power supply 201 and the power utilization factor $P_{UTIL}$ to determine when to enter an over current protection mode to, for example, protect power control system 200 from an over current event. In at least one embodiment, an over current event refers to an increase in the output current $i_{OUT}$ above a predetermined output current threshold $i_{OUT\_TH}$. In at least one embodiment, the OCP module 204 does not utilize sensed currents to protect the power control system 200 from an over current event, and, thus, avoids power losses associated with current sensing.

As subsequently described in more detail, the rated power $P_{RATED}$ of power control system 200 represents an amount of power that power supply 201 can nominally supply to load 212. For example, a rated power $P_{RATED}$ of 100 W indicates that the power supply 201 can nominally supply load 212 with up to 100 W of power. Power supply 201 also has a maximum power $P_{MAX}$. The maximum power $P_{MAX}$ is generally a percentage increase of, for example 25%, over the rated power $P_{RATED}$. Thus, in at least one embodiment, for a rated power $P_{RATED}$ of 100 W and a 25% increase, a maximum power $P_{MAX}$ is 125% of the rated power $P_{RATED}$, which equals 125 W. The maximum power $P_{MAX}$ represents an amount of power that power supply 201 can supply to load 212 while maintaining an approximately constant output voltage $V_{OUT}$. Equation [1] represents an exemplary relationship between the output power P of power supply 201, the output current $i_{OUT}$, and the output voltage $V_{OUT}$:

$$P = V_{OUT} \cdot i_{OUT} \qquad [1],$$

where P represents the power supplied by power supply 201, $V_{OUT}$ represents the output voltage of output stage 210, and $i_{OUT}$ represents the output current of output stage 210.

Power control system 200 maintains an approximately constant output voltage $V_{OUT}$ if the power demand of load 212 is less than or equal to the maximum power $P_{MAX}$ of power supply 201. If load 212 begins to demand more power from power supply 201 than the maximum power $P_{MAX}$, then P equals $P_{MAX}$ in Equation [1], output current $i_{OUT}$ will increase in proportion to the power demand increase, and the output voltage $V_{OUT}$ will decrease in accordance with Equation [1]. In at least one embodiment, when power utilization factor $P_{UTIL}$ equals 1 (indicating that the power control system is generating 100% of rated power) and the output voltage $V_{OUT}$ decreases to a predetermined threshold voltage $V_{OUT\_TH}$. In at least one embodiment, the threshold voltage $V_{OUT\_TH}$ is set to correspond with a maximum allowable output current $i_{OUT}$, as described below. The OCP module 204 generates an output signal OCP indicating entry into over current protection mode. The particular operation(s) associated with the over current protection mode is a matter of design choice. In at least one embodiment, in over current protection mode, controller 202 turns PFC stage 206 OFF. In another embodiment, controller 202 turns PFC stage 206 OFF and, then, restarts PFC stage 206.

For the power control system 200 to convert the input voltage $V_X$ into the output voltage $V_{OUT}$, the PFC stage 206 receives the input voltage $V_X$. In at least one embodiment, the input voltage $V_X$ is a rectified alternating current (AC) voltage, such as a rectified 60 Hz/110 V line voltage in the United States of America or a rectified 50 Hz/220 V line voltage in Europe. The particular topology of the PFC stage 206 is a matter of design choice. For example, PFC stage 206 can be a switching type boost, buck, buck-boost, or Cúk converter. The PFC stage 206 generates a link voltage $V_{LINK}$. In at least one embodiment, the link voltage $V_{LINK}$ is a regulated, approximately DC voltage.

The power supply 201 also includes an isolation stage 208 that isolates the PFC stage 206 from an output stage 210 and converts the link voltage $V_{LINK}$ into a secondary voltage $V_S$. The particular topology of the isolation stage 208 is a matter of design choice. For example, the isolation stage 208 can be a transformer based isolation stage such as a flyback, full bridge, or half bridge transformer.

The output stage 210 receives the secondary voltage $V_S$ and provides an output voltage $V_{OUT}$ and an output current $i_{OUT}$ to load 212. The particular topology of the output stage 210 is also a matter of design choice. For example, output stage 210 can have a flyback topology. The load 212 can be any load for which power control system 200 can provide power. Examples of load 212 include lamps, such as light emitting diode and gas discharge type lamps, cellular telephones, personal computer (PCs) computing devices including personal digital assistants, and other electronic devices. Additionally, in at least one embodiment, isolation stage 208 and output stage 210 are separate and distinct as shown in FIG. 2. In at least one embodiment, isolation stage 208 and output stage 210 are combined into a single circuit. For example, in at least one embodiment, isolation stage 208 and output stage 210 are configured together as a single, flyback converter.

In addition to providing over current protection, controller 202 generates a control signal $CS_1$ for PFC stage 206 to control power factor correction of PFC stage 206 and, in at least one embodiment, to also regulate the link voltage $V_{LINK}$ to a particular value. U.S. patent application Ser. No. 11/967,269, entitled "POWER CONTROL SYSTEM USING A NONLINEAR DELTA-SIGMA MODULATOR WITH NONLINEAR POWER CONVERSION PROCESS MODELING", filed Dec. 31, 2007, inventor John L. Melanson, and assignee Cirrus Logic, Inc. (referred to herein as "Melanson I") describes exemplary generation of control signal, such as control signal $CS_1$, and control of PFC stage implemented as a switching power converter. Controller 202 also generates control signals $CS_2$ through $CS_N$ to control isolation stage 208, and N is an integer index and is greater than or equal to 2. Melanson I describes exemplary generation of control signals $CS_2$ through $CS_N$. In at least one embodiment, controller 202 can be implemented as one or more physically distinct circuits. For example, in at least one embodiment, controller 202 is a single integrated circuit. In at least one embodiment, controller 202 is implemented as two embodiments with one embodiment controlling PFC stage 206 and one embodiment controlling isolation stage 208. Melanson I is hereby incorporated by reference in its entirety.

Figure 3:
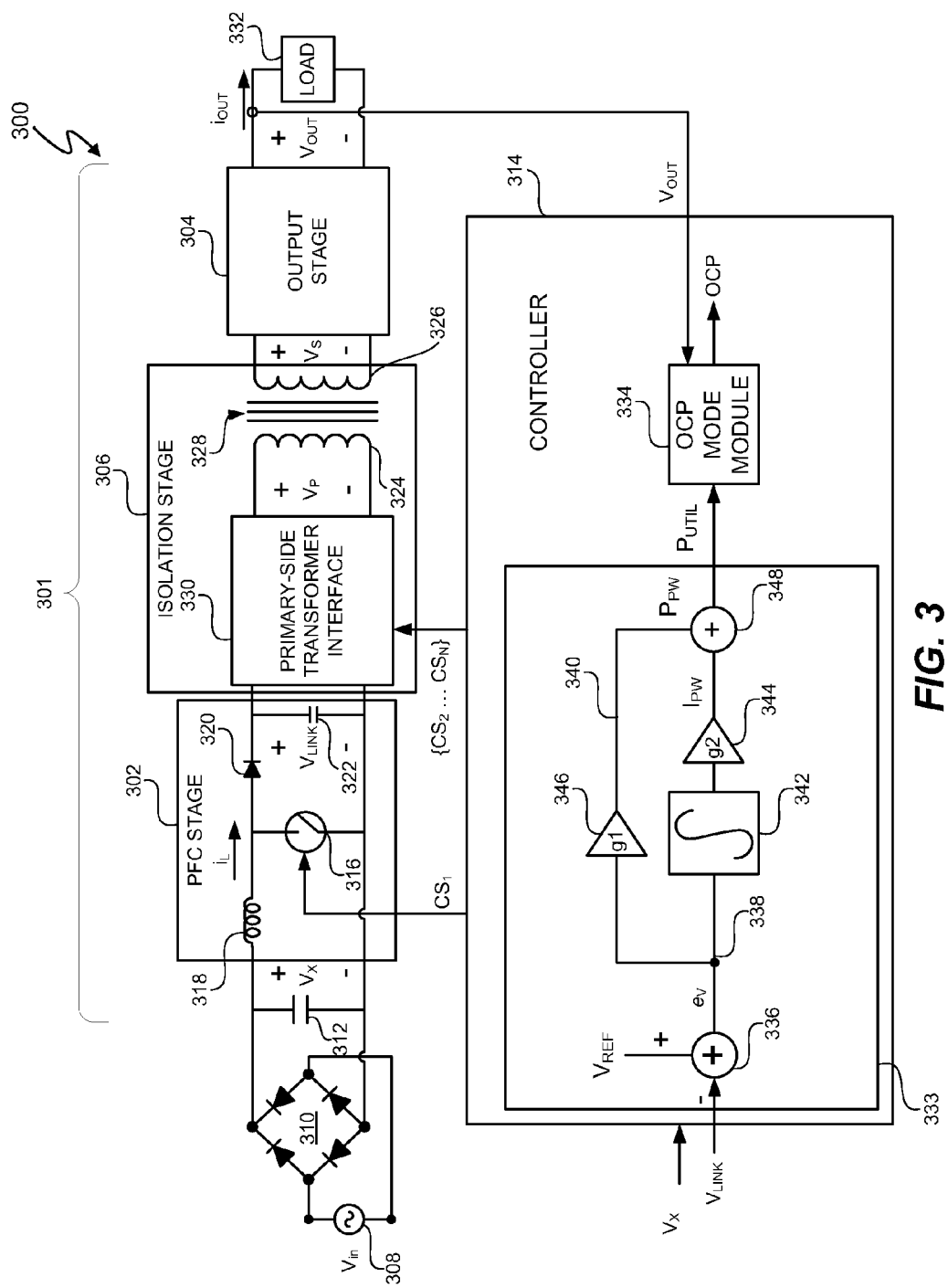
FIG. 3 depicts an embodiment of the power control system of FIG. 2.

FIG. 3 depicts power control system 300, which represents one embodiment of power control system 200. Power control system 300 includes a power supply 301, and power supply 301 includes a PFC stage 302, an output stage 304, and an isolation stage 306 to isolate the PFC stage 302 from the output stage 304. Voltage source 308 supplies an alternating current (AC) input voltage $V_{IN}$ to a full bridge diode rectifier 310. Capacitor 312 provides high frequency filtering. The voltage source 308 is, for example, a public utility, and the AC voltage $V_{IN}$ is, for example, a 60 Hz/110 V line voltage in the United States of America or a 50 Hz/220 V line voltage in Europe. The rectifier 310 rectifies the input voltage $V_{in}$ and supplies a rectified, time-varying, line input voltage $V_X$ to the PFC stage 302.

The power control system 300 includes a controller 314 to regulate a link voltage $V_{LINK}$ of PFC stage 302 and control isolation stage 306. Controller 314 also protects power control system 300 when load 332 is demanding more than the rated power $P_{RATED}$ of power supply 301 and the output voltage decreases below a predetermined threshold value $V_{OUT\_TH}$. Controller 314 generates a pulse-width modulated switch control signal $CS_1$ to control power factor correction and regulate the link voltage $V_{LINK}$ of PFC stage 302. PFC stage 302 is a boost-type, switching power converter, and switch control signal $CS_1$ is a switch control signal that controls switch 316. In at least one embodiment, switch control signal $CS_1$, is a duty cycle modulated signal, and switch 316 is a field effect transistor (FET). Controller 314 monitors voltages $V_X$ and $V_{LINK}$ to generate switch control signal $CS_1$. In at least one embodiment, controller 314 generates switch control signal $CS_1$ as described in Melanson I.

The PFC stage 302 includes an inductor 318 that conducts a current $i_L$. When switch 316 is ON, diode 320 is reverse biased, and inductor current $i_L$ energizes inductor 318. When switch 316 is OFF, diode 320 is forward biased, and inductor current $i_L$ charges link capacitor 322. The link voltage $V_{LINK}$ across link capacitor 322 remains approximately constant during operation of PFC stage 302. Controller 314 operates PFC stage 302 in discontinuous conduction mode (DCM). In DCM, the inductor current $i_L$ decreases to zero while switch 316 is OFF and remains at zero for a finite time before switch 316 turns ON.

Isolation stage 306 isolates the PFC stage 302 from the output stage 304 and converts the DC link voltage $V_{LINK}$ into an AC voltage so that transformer 328 can transfer energy from link capacitor 322 via the primary side windings 324 to the secondary-side windings 326 of transformer 328. Isolation stage 306 also includes a primary-side transformer interface 330. The primary-side transformer interface 330 can be any type of interface. In at least one embodiment, primary-side transformer interface 330 is a half-bridge interface as described in U.S. patent application Ser. No. 12/415,830, entitled "PRIMARY-SIDE BASED CONTROL OF SECONDARY-SIDE CURRENT FOR A TRANSFORMER," inventor John L. Melanson, Attorney Docket No. 1812-IPD, and filed on Mar. 31, 2009 describes exemplary methods and systems and is incorporated by reference in its entirety and referred to herein as Melanson II. Control signals $CS_2$ through $CS_N$ control isolation stage 306, and N is an integer index that is greater than or equal to 2. A variety of other topologies are well-known for isolation stage 306, such as full-bridge topologies as discussed in chapter 6 of *Fundamentals of Power Electronics*.

The output stage 304 converts the secondary voltage $V_S$ into the output voltage $V_{OUT}$. The topology of output stage 304 is a matter of design choice. In at least one embodiment, the output stage 304 is a half-bridge, buck converter as described in Melanson II. Other exemplary topologies, such as a full-bridge buck converter, are also discussed in chapter 6 of *Fundamentals of Power Electronics*.

Power supply 301 supplies load 332 with output voltage $V_{OUT}$ and output current $i_{OUT}$. Controller 314 regulates the link voltage $V_{LINK}$ and the primary-side voltage $V_P$ to establish a particular value for the secondary-side load current $i_{OUT}$. Controller 314 includes a power utilization module ("$P_{UTIL}$, module") 333 which represents one embodiment of power utilization module 203. The $P_{UTIL}$ module 333 generates the power utilization factor $P_{UTIL}$. The power utilization factor $P_{UTIL}$ varies as the difference between the reference voltage $V_{REF}$ and the link voltage $V_{LINK}$, as represented by error signal $e_v$ from error generator 336 varies. The link voltage $V_{LINK}$ varies in proportion to the power demand by load 332. Accordingly, the power utilization factor $P_{UTIL}$ also varies in proportion to power demand by load 332. As previously described, the power utilization factor $P_{UTIL}$ is a normalized representation of the power demand of load 332. In at least one embodiment, the reference voltage $V_{REF}$ is set to a desired value of the link voltage $V_{LINK}$. For example, in at least one embodiment, the desired value of link voltage $V_{LINK}$ is 100V, so the reference voltage $V_{REF}$ is set to 100 V. The $P_{UTIL}$ module 333 includes an integral signal path 338 and a proportional signal path 340.

The integral signal path 338 includes an integrator 342 to integrate the error signal $e_v$ and also includes a gain module 344 to multiply the integral of error signal $e_v$ by a gain factor g2 and generate the integrated output signal $I_{PW}$. The proportional path 340 includes a gain module 346 to multiply the error signal $e_v$ by a gain factor g1 and generate the proportional output signal $P_{PW}$. Adder 348 adds the integrated output signal $I_{PW}$ and the proportional output signal $P_{PW}$ to generate the power utilization factor $P_{UTIL}$. The values of gain factors g1 and g2 are a matter of design choice. The gain factors g1 and g2 affect the responsiveness of OCP module 314 in tracking changes in power demand by load 332. Exemplary values of gain factors g1 and g2 are set forth in the emulation code of FIGS. 8-31 in Melanson I. Additionally, in at least one embodiment, the link voltage $V_{LINK}$, the reference voltage $V_{REF}$, and the output voltage $V_{OUT}$ monitored by the $P_{UTIL}$ module 333 are scaled versions of the actual voltages.

Controller 314 also includes OCP module 334 to detect an over current event in power supply 301. The OCP module 334 also provides an over current protection signal OCP that causes power control system 300 to enter an over current protection mode. In at least one embodiment, over current protection signal OCP causes power control system 300 to enter an over current protection mode when power supply 301 is operating above 100% rated power $P_{RATED}$.

Figure 4:
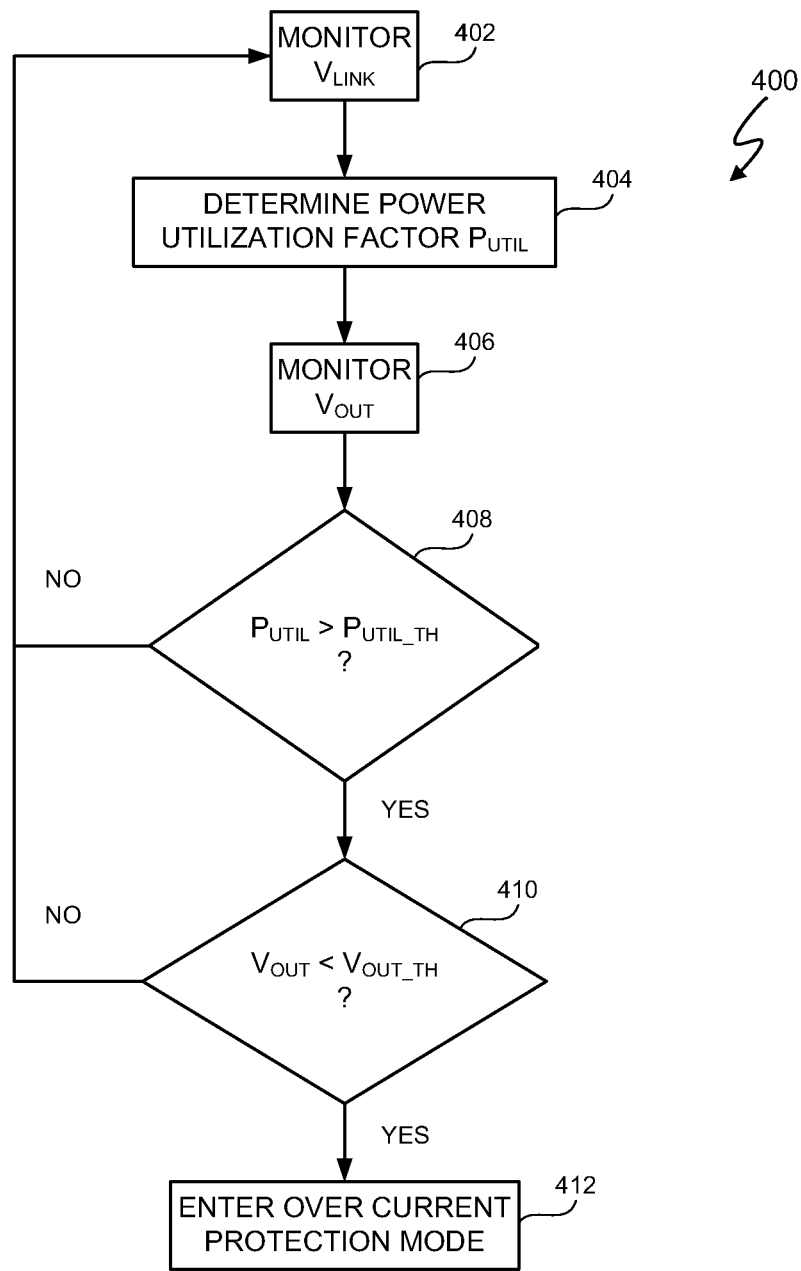
FIG. 4 depicts an over current protection algorithm.

FIG. 4 depicts an exemplary over current protection algorithm 400. Referring to FIGS. 3 and 4, in at least one embodiment, the OCP module 314 determines whether to cause power control system 300 to enter over current protection mode in accordance with the over current protection algorithm 400. In operation 402, the $P_{UTIL}$ module 333 monitors the link voltage $V_{LINK}$, and in operation 404, power utilization factor $P_{UTIL}$ is determined.

In operation 406, OCP mode module 334 monitors the output voltage $V_{OUT}$. The OCP module 334 stores a power utilization factor threshold $P_{UTIL\_TH}$. In at least one embodiment, the power utilization factor threshold $P_{UTIL\_TH}$ is set to a value that indicates the power demand of load 332 is at or close to 100% of the rated power $P_{RATED}$ of power supply 301. In at least one embodiment, the power utilization factor threshold $P_{UTIL\_TH}$ is set to a value that reflects a margin of error in the determination of the power utilization factor $P_{UTIL}$. For example, in at least one embodiment, power utilization factor threshold $P_{UTIL\_TH}$ is 0.95, which reflects a margin of error of 5% in the determination of power utilization factor $P_{UTIL}$.

In operation 408, the OCP mode module 334 determines whether the power utilization factor $P_{UTIL}$ is greater than the power utilization factor threshold $P_{UTIL\_TH}$. If power utilization factor $P_{UTIL}$ is less than the power utilization factor threshold $P_{UTIL\_TH}$, then load 332 is not demanding more than 100% of the rated power $P_{RATED}$ of power supply 301. OCP module 334 then returns to operation 402 and continues therefrom. If the power utilization factor $P_{UTIL}$ is greater than the power utilization factor threshold $P_{UTIL\_TH}$, then load 332 is demanding more power than the power corresponding to the power utilization factor threshold $P_{UTIL\_TH}$. For example, if power utilization factor threshold $P_{UTIL\_TH}$ is 0.95, then load 332 is demanding at least 95% (+/− a margin of error) of the rated power $P_{RATED}$ of power supply 301. If the response to operation 408 is "YES", OCP module 334 proceeds to operation 410. In operation 410, OCP mode module 334 determines whether the output voltage $V_{OUT}$ is less than the threshold voltage $V_{OUT\_TH}$.

Figure 5:
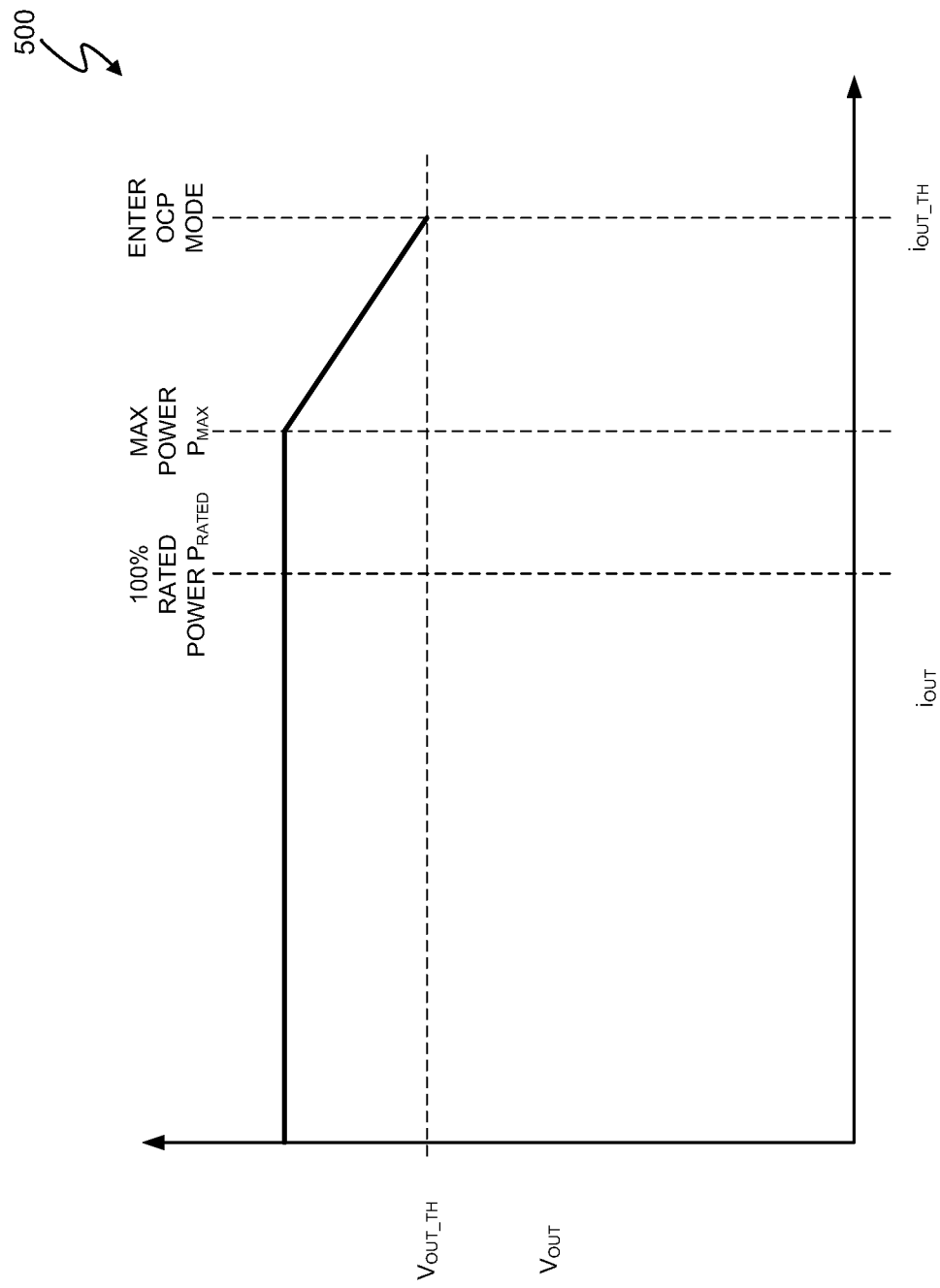
FIG. 5 depicts an over current protection graph.

FIG. 5 depicts an exemplary over current protection graph 500, which depicts the relationship between the output voltage $V_{OUT}$ (FIG. 3), the output current $i_{OUT}$, and entry into over current protection mode by power control system 300. Referring to FIGS. 3, 4, and 5. If the power demand of load 332 exceeds the maximum power $P_{MAX}$ of power supply 301, the output current $i_{OUT}$ will increase and the output voltage $V_{OUT}$ will decrease in accordance with Equation [1]. In at least one embodiment, the threshold voltage $V_{OUT\_TH}$ is set to correspond with a maximum allowable output current $i_{OUT}$. For example, if the maximum power $P_{MAX}$ of power supply 301 is 100 W, and the maximum allowable output current $i_{OUT\_TH}$ is 10 A, then the threshold voltage $V_{OUT\_TH}$ is set to 10V. Thus, if operation 410 determines that the output voltage $V_{OUT}$ is greater than the threshold voltage $V_{OUT\_TH}$, then: (1) from operation 408, load 332 is demanding more power than the maximum power $P_{MAX}$ of power supply 301 and (2) the output current $i_{OUT}$ exceeds the maximum allowable output current $i_{OUT\_TH}$.

To protect power control system 300 from an output current $i_{OUT}$ exceeding the maximum allowable output current $i_{OUT\_TH}$, in operation 412, OCP mode module 334 generates the OCP signal indicating an over current protection event, and controller 314 enters over current protection mode. The particular over current protection mode is a design choice. In at least one embodiment, in over current protection mode, controller 314 turns PFC stage 302 OFF. In another embodiment, controller 314 turns PFC stage 302 OFF and, then, restarts PFC stage 206.

Thus, in at least one embodiment, a power control system can provide overcurrent protection using sensed voltages without incurring current sensing power losses.

Although the present invention has been described in detail, it should be understood that various changes, substitutions and alterations can be made hereto without departing from the spirit and scope of the invention as defined by the appended claims.

What is claimed is:

1. An apparatus comprising:
a controller to control a power supply and provide over current protection for an output current of the power supply, wherein the controller is configured to provide the over current protection for the power supply using power utilization information and an output voltage of an output stage of the power supply, wherein the power utilization information represents power utilization of the power supply and the controller is configured to enter an over current protection mode if the power utilization information indicates power demanded from the power supply exceeds a maximum power of the power supply and an output voltage of the power supply is below a threshold voltage.

2. The apparatus of claim 1 wherein the power utilization information is derived from a comparison between a link voltage of a power factor correction stage of the power supply and a reference voltage, and the reference voltage represents a desired value for the link voltage.

3. The apparatus of claim 1 wherein the controller is configured to provide over current protection for the power supply without sensing a current in an output stage of the power supply.

4. The apparatus of claim 3 wherein the controller is configured to provide over current protection for the power supply without sensing a current.

5. The apparatus of claim 1 wherein the threshold voltage relates to a predetermined maximum threshold output current of the power supply.

6. The apparatus of claim 1 wherein the over current protection mode comprises the controller turning the power supply OFF.

7. The apparatus of claim 1 further comprising:
the power supply coupled to the controller.

8. The apparatus of claim 7 wherein the power supply comprises a switching power converter and the controller is further configured to control power factor correction of the switching power converter.

9. The apparatus of claim 1 wherein to control a power supply and provide over current protection for an output current of the power supply, the controller is further configured to:
determine the power utilization information representing an amount of power demanded of the power supply by a load coupled to the power supply;
monitor an output voltage of the power supply;
determine when the power utilization information exceeds a predetermined threshold value and when the output voltage decreases to a predetermined threshold voltage; and
provide the over current protection for the power supply when the controller determines that the power utilization information exceeds the predetermined threshold value and the output voltage decreases to a predetermined threshold voltage.

10. A method comprising:
controlling a power supply, wherein controlling the power supply includes using power utilization information and an output voltage of an output stage of the power supply to provide over current protection for an output current of the power supply wherein the power utilization information represents power utilization of the power supply; and
entering an over current protection mode if the power utilization information indicates power demanded from the power supply exceeds a maximum power of the power supply and an output voltage of the power supply is below a threshold voltage.

11. The method of claim 10 further comprising:
comparing a link voltage of a power factor correction stage of the power supply and a reference voltage, wherein the reference voltage represents a desired value for the link voltage; and
deriving the power utilization information from an outcome of comparing the link voltage and the reference voltage.

12. The method of claim 10 further comprising:
providing over current protection for the power supply without sensing a current in an output stage of the power supply.

13. The method of claim 12 further comprising:
providing over current protection for the power supply without sensing a current.

14. The method of claim 10 wherein the threshold voltage relates to a predetermined maximum threshold output current of the power supply.

15. The method of claim 10 wherein entering the over current protection mode comprises turning the power supply OFF.

16. The method of claim 10 wherein the power supply comprises a switching power converter, the method further comprising:
controlling power factor correction of the switching power converter.

17. The method of claim 10 wherein controlling the power supply further includes:
determining the power utilization information representing an amount of power demanded of the power supply by a load coupled to the power supply;
monitoring an output voltage of the power supply;
determining when the power utilization information exceeds a predetermined threshold value and when the output voltage decreases to a predetermined threshold voltage; and
providing the over current protection for the power supply when the controller determines that the power utilization information exceeds the predetermined threshold value and the output voltage decreases to a predetermined threshold voltage.

18. An apparatus comprising:
a controller to control a switching power supply and provide over current protection, wherein the controller is configured to:
monitor a link voltage of a switching power converter;
determine a power utilization factor representing an amount of power demanded of the power supply by a load coupled to the power supply;
monitor an output voltage of the switching power converter;
determine if the power utilization factor is greater than a power utilization factor threshold value;
determine if an output voltage of the switching power converter is greater than an output voltage threshold value; and
if the power utilization factor is greater than a power utilization factor threshold value and the output voltage is less than the output voltage threshold value, then enter an over current protection mode.

19. The apparatus of claim 18 wherein the over current protection mode comprises the controller turning the power supply OFF.

20. The apparatus of claim 18 further comprising:
the switching power supply coupled to the controller.

21. The apparatus of claim 20 wherein the switching power supply further comprises a power factor correction stage, an isolation stage, and an output stage.

22. The apparatus of claim 18 wherein to control a switching power supply and provide over current protection further comprises to control a switching power supply and provide over current protection for an output current of the power supply.

23. A method comprising:
providing over current protection for an output current of a switching power supply, wherein providing over current protection for an output current of the switching power supply comprises:
monitoring a link voltage of a stage of the switching power supply coupled to an output stage of the switching power supply;
determining a power utilization factor, wherein the power utilization factor represents an amount of power demanded of the switching power supply by a load coupled to the switching power supply;
monitoring an output voltage of the switching power supply;
determining if the power utilization factor is greater than a power utilization factor threshold value;
determining if an output voltage of the switching power supply is greater than an output voltage threshold value; and
if the power utilization factor is greater than a power utilization factor threshold value and the output voltage is less than the output voltage threshold value, then entering an over current protection mode.

24. An apparatus comprising:
a controller to control a power supply and provide over current protection for an output current of the power supply, wherein the controller is configured to provide the over current protection for the power supply using power utilization information and an output voltage of an output stage of the power supply, wherein the power utilization information represents power utilization of the power supply and to control a power supply and provide over current protection for an output current of the power supply, the controller is further configured to:
determine the power utilization information representing an amount of power demanded of the power supply by a load coupled to the power supply;
monitor an output voltage of the power supply;
determine when the power utilization information exceeds a predetermined threshold value and when the output voltage decreases to a predetermined threshold voltage; and
provide the over current protection for the power supply when the controller determines that the power utilization information exceeds the predetermined threshold value and the output voltage decreases to a predetermined threshold voltage.

25. A method comprising:
controlling a power supply, wherein controlling the power supply includes using power utilization information and an output voltage of an output stage of the power supply to provide over current protection for an output current of the power supply wherein the power utilization information represents power utilization of the power supply, and controlling the power supply further includes:
determining the power utilization information representing an amount of power demanded of the power supply by a load coupled to the power supply;
monitoring an output voltage of the power supply;
determining when the power utilization information exceeds a predetermined threshold value and when the output voltage decreases to a predetermined threshold voltage; and
providing the over current protection for the power supply when the controller determines that the power utilization information exceeds the predetermined threshold value and the output voltage decreases to a predetermined threshold voltage.

* * * * *